United States Patent [19]

Masaki et al.

[11] Patent Number: 5,230,042

[45] Date of Patent: Jul. 20, 1993

[54] DIGITAL IMAGE PROCESSING APPARATUS

[75] Inventors: Yasuo Masaki; Kimitoshi Hori, both of Osaka, Japan

[73] Assignee: Minolta Camera Kabushiki Kaisha, Osaka, Japan

[21] Appl. No.: 609,025

[22] Filed: Nov. 1, 1990

Related U.S. Application Data

[63] Continuation of Ser. No. 249,335, Sep. 26, 1988, abandoned.

[30] Foreign Application Priority Data

Sep. 25, 1987 [JP] Japan .................. 62-240259

[51] Int. Cl.$^5$ .................................. G06F 15/40
[52] U.S. Cl. ............................ 395/162; 340/747; 340/798
[58] Field of Search ............ 395/162, 163, 164; 340/798, 799, 747, 750; 364/518, 521, 522, 200, 900

[56] References Cited

U.S. PATENT DOCUMENTS

| | | | |
|---|---|---|---|
| 4,604,722 | 8/1986 | Staplin, Jr. et al. | 364/736 |
| 4,720,803 | 1/1988 | Ishii | 364/521 |
| 4,791,580 | 12/1988 | Sherrill et al. | 364/521 |
| 5,043,713 | 8/1991 | Katsura et al. | 340/747 |

Primary Examiner—Phu K. Nguyen
Attorney, Agent, or Firm—Burns, Doane, Swecker & Mathis

[57] ABSTRACT

A control circuit controls a hardware portion based on a microprogram set by a host CPU. Microinstructions constituting the microprogram comprise an instruction for setting an initial value of an address counter for reading microprogram as well as an instruction for controlling the hardware portion. The initial value setting instruction comprises an initial value setting instruction which uses the state of a flag register, which is set dependent on a change of state generated from the arithmetic processing in the hardware portion, as a condition. Therefore, the flow of reading of the microprogram can be changed corresponding to the change of the state generated by the arithmetic processing in the hardware portion.

2 Claims, 11 Drawing Sheets

FIG. 3(a)
(PRIOR ART)
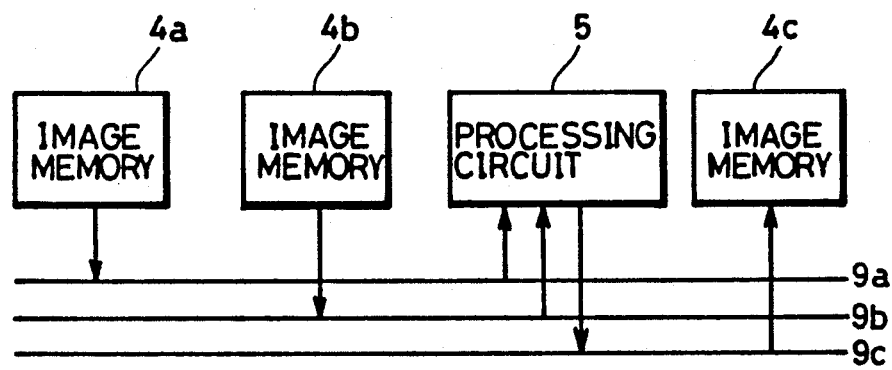
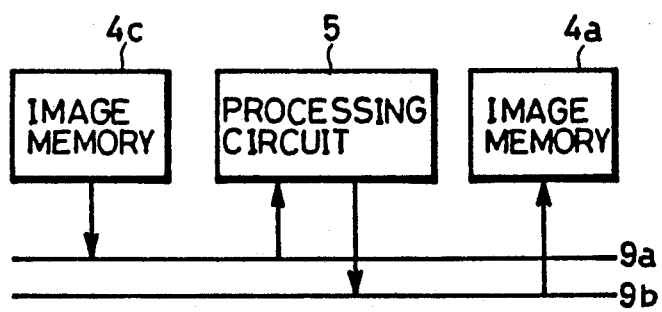
FIG. 3(b)
(PRIOR ART)
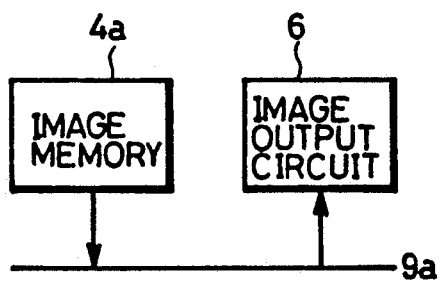
FIG. 3(c)
(PRIOR ART)

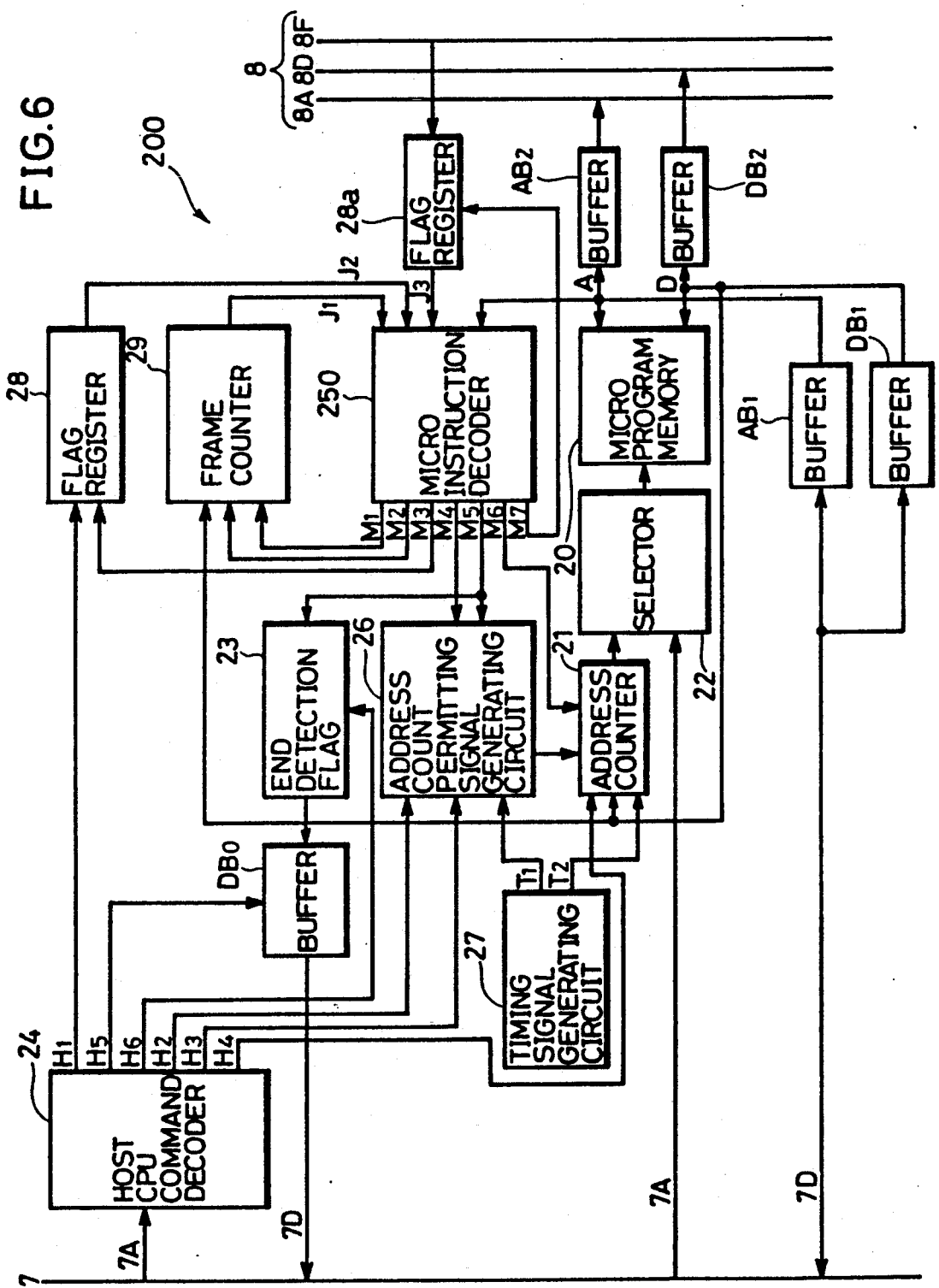

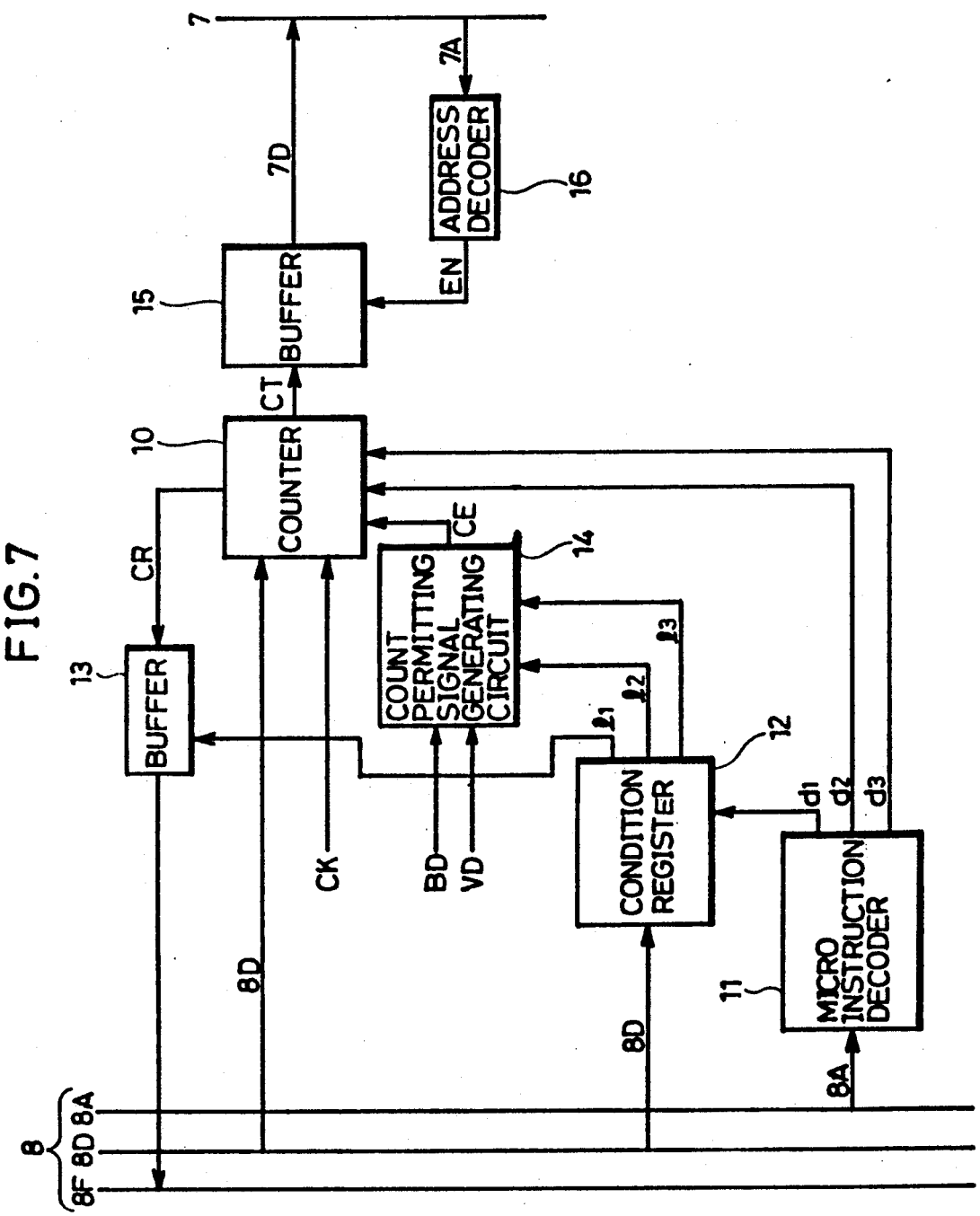

DIGITAL IMAGE PROCESSING APPARATUS

This application is a continuation of application Ser. No. 07/249,335, filed Sep. 26, 1988, now abandoned.

BACKGROUND OF THE INVENTION

1. Field of the Invention

The present invention relates to a digital image processing apparatus and, more specifically, it relates to a digital image processing apparatus arithmetically processing original image data to enable image data converting processes such as gradation correction, sharpening of image quality, and processes such as feature extraction from the image data.

2. Description of the Prior Art

A digital image processing apparatus comprises an image input circuit for inputting image data, an image output circuit for outputting image data, an image memory storing image data, and a hardware portion such as processing circuits for carrying out arithmetic processes on image data in order to realize desired image processing function, and the circuits included in the hardware portion must be set up at a prescribed operation state. In order to carry out different image processing functions successively, the setting of the operation states must be updated successively. Although the setting and updating of operation states are well controlled by the software processing, the proportion of the software controlling the hardware to the entire software for image processing becomes large, causing disadvantages such that the program becomes large, the program largely depends on the hardware, and so on. In addition, since program fetching is required in controlling hardware, high speed control of the hardware portion becomes difficult, and the control in synchronization with the operation timing characteristic of the hardware is difficult. In view of the foregoing, a control circuit for controlling the hardware portion has been provided between the host CPU governing the software processing and the hardware portion realizing actual image processing in the conventional image processing apparatus, wherein information for controlling each hardware portion is micro-programmed in the control circuit, the microprogram is stored in a microprogram memory, and when a microprogram is read in accordance with a processing request from the host CPU, necessary hardware control is carried out to realize a prescribed image processing function. According to this method, the hardware control portion included in the software of the host CPU is considerably reduced, the hardware dependency of the software can be decreased, and the hardware can be controlled at high speed. The control operation in synchronization with the operation timing of the hardware becomes possible by carrying out the reading of microprogram during that period in the operation cycle of the hardware in which image data are not treated.

Prior to the present invention, we have proposed a control method utilizing a microprogram which enables control in synchronization with the operation timing of the hardware, as described above. We have listed various micro instructions for controlling the reading flow of the microprogram as well as the effects U.S. Ser. No. 089,558 (filed on Aug. 26, 1987). More detailed description will be given in the following with reference to the figures.

FIG. 1 is a block diagram showing one example of the structure of a previously proposed digital image processing apparatus utilizing microprogram system. In the figure, the digital image processing apparatus comprises a host CPU 1, a control circuit 2, an image input circuit 3, an image memory 4, a processing circuit 5, an image output circuit 6, a host CPU bus 7 which is used by the host CPU 1 to access hardware in the memory space of itself, a control bus 8 which is used by the control circuit 2 to apply micro instructions to each of the circuits 3~6, and an image data bus 9 for transferring image data between each of the circuits 3~6 at high speed.

The main role of the host CPU is to interpret the commands applied by an operator, to control the hardware in accordance with an algorithm governing the flow of the whole processing circuits, and so on. Sometimes, it directly accesses the image memory 4 to execute, by software processing, the function which can not be realized by the processing circuit 5, accesses the processing circuit 5 to initialize a table memory and the like therein, and so on. The basic arithmetic processes are effected by the processing circuit 5 on image data on the image data bus 9. The image data to be processed are provided from the image input circuit 3, the image memory 4, and so on. The results of processing are outputted onto the image data bus 9 to be written in the image memory 4, or to be inputted to the image output circuit 6. When a hardware processing should be done utilizing the processing circuit 5 and the image data bus 9, the control operation such as designation of an image output device to the image data bus 9 and of the image input device from the image data bus 9, setting of the function of the processing circuit 5, and so on must be done prior to the processing.

The control circuit 2 comprises a microprogram memory therein, and outputs necessary microprogram on the microprogram memory to the control bus 8 at a prescribed timing in accordance with a processing request from the host CPU 1. Various micro instructions for designating image output device, for designating image input device, for setting the function of the processing circuit 5, and so on are included in the read micro program. Each of the circuits to be controlled decodes the micro instruction for the circuit, and is set at a desired state prior to the processing state.

FIG. 2 shows an example of the structure of the control circuit 2 shown in FIG. 1.

A microprogram memory 20 stores microprogram.

An address counter 21 generates a read address to be applied to the microprogram memory 20.

An address selector 22 selects either a read address outputted from the address counter 21 or a write address which is provided by the host CPU 1 in setting microprogram to the microprogram memory 20.

An end detection flag 23 detects the end of reading of the microprogram.

A host CPU command decoder 24 decodes various commands applied from the host CPU 1 to the control circuit 2 through the host CPU bus 7A.

A micro instruction decoder 25 decodes micro instructions for controlling reading of the microprogram.

An address count permitting signal generating circuit 26 controls permission/non-permission of counting operation of the counter 21.

A timing signal generating circuit 27 generates timing signals for realizing reading of the microprogram in synchronization with the operation timing of the circuit controlled.

A flag register 28 is set by the host CPU 1 with the output being one of the jump conditions of a conditional jump instruction.

A frame counter 29 is used in a loop counter and the like, with the state of the counter being one of the jump conditions.

The micro instruction read from the microprogram memory 20 comprises an address portion A and a data portion D. A data buffer DB0 informs the host CPU 1 through the host CPU bus 7D of the state of the end detection flag 23. Data buffers AB1 and DB1 provides write data when the host CPU 1 sets microprogram in the microprogram memory 20, data buffers AB2 and DB2 transmit the address portion A and the data portion D of the micro instruction read from the microprogram memory 20 to the control bus 8 (8A and 8D).

The host CPU command decoder 24 provides six decode output H1-H6. The decode output H1 is a flag set command of the flag register 28. The decode outputs H2 and H3 are commands both applied to the address count permitting signal generating circuit 26, H2 is a start command and H3 is an end command. The decode output H4 is a clear command for clearing the count value of the address counter 21. The decode output H5 is an end check command for reading the state of the end detection flag 23. The decode output H6 is an end detection flag reset command for resetting the end detection flag.

A timing signal generating circuit 27 generates two timing signals. The timing signal T1 is utilized by the address count permitting signal generating circuit 26 to define the period in which the micro instruction can be transmitted. The timing signal T2 is a clock signal for counting of the address counter 21.

The micro instruction decoder 25 provides fixed decode outputs M1~M6. The decode output M1 corresponds to the count down instruction of the frame counter 29; the decode output M2 corresponds to an initial value load instruction of the flag counter 29; the decode output M3 corresponds to a reset instruction of the flag register 28; the decode output M4 corresponds to a read interruption instruction (EOFR instruction) which interrupts the reading of the microprogram until the start of the next frame; the decode output M5 corresponds to a read end instruction (EXIT instruction) which ends the reading of the microprogram; and the decode output M6 corresponds to a jump instruction, respectively. The decode output M5 sets the end detection flag 23.

The output J1 of the frame counter 29 and the output J2 of the flag register 28 are used as jump condition for decoding the conditional jump instruction. The output J1 becomes active when the count value of the frame counter 29 is 0, while the output J2 becomes active when the flag register 28 is set.

The operation of the controlling circuit 2 shown in FIG. 2 will be described in the following with specific examples.

EXAMPLE 1

FIG. 3 shows the relation of connection between each of the circuits in executing an arithmetic processing in accordance with the order of the process. FIG. 3(a) shows the processing states in the first frame, FIG. 3(b) shows the processing states in the second frame and FIG. 3(c) shows the processing states in the third and following frames.

In the first frame, the output data of two planes of image memories 4a and 4b are read to the image data buses 9a and 9b; the image data on the image data buses 9a and 9b are outputted to the processing circuit 5; the results of an addition processing, for example, in the processing circuit 5 are outputted to the image data bus 9c; and the image data on the image data bus 9c are written in the image memory 4c.

In the second frame, the output data from the image memory 4c, in which the results of operation of the last frame are stored, are read on the image data bus 9a; the image data on the image data bus 9a are inputted to the processing circuit 5; the results of luminance inverting processing, for example, in the processing circuit 5 are outputted on the image data bus 9b; and the image data on the image data bus 9b are written in the image memory 4a.

Finally, in the third frame, the output data of the image memory 4a, in which the final results of processing are stored, are read to the image data bus 9a; the image data on the image data bus 9a are inputted to the image output circuit 6 to be externally outputted. In the image output circuit 6, the input data are D/A converted to analog video signals to be displayed on an external display apparatus (not shown) and the like, for example.

In the following frames after the fourth frame, the state of the third frame is maintained, and the image display is continued. The flow of the above processes is represented by a microprogram such as the following list (I).

LIST (I)

| ADDRESS | MICRO INSTRUCTION | |
|---|---|---|
| 0 | OUT | 4a → 9a |
| 1 | OUT | 4b → 9b |
| 2 | INP | 9a, 9b → 5 |
| 3 | OUT | 5 → 9c |
| 4 | SET | 5, ADD |
| 5 | INP | 9c → 4c |
| 6 | EOFR | |
| 7 | IMRC | |
| 8 | OUT | 4c → 9a |
| 9 | INP | 9a → 5 |
| 10 | SET | 5, INV |
| 11 | OUT | 5 → 9b |
| 12 | INP | 9b → 4a |
| 13 | EOFR | |
| 14 | IMRC | |
| 15 | OUT | 4a → 9a |
| 16 | INP | 9a → 6 |
| 17 | SET | 6, DISPLAY |
| 18 | EXIT | |

In this example, the micro instructions are of mnemonic representation so that the functions thereof are easy understood. Actually, the micro instructions comprises an address portion for designating the circuit to be controlled, designating the register in the circuit to be controlled, or designating the instruction to the control circuit itself, and a data portion indicating parameters characteristic of each of the micro instructions. Referring to the list (I), OUT is a micro instruction by which the image output device designates a data bus on which the data are outputted. INP is a micro instruction by which the image input device designates a data bus from which the data are inputted. SET is a micro instruction for setting the states of the processing circuit 5 and of the image output circuit 6. IMRC is a micro instruction for initializing the image memory 4 and the processing circuit 5 at a non-operating state in which there is no input/output of image data. EFOR is a micro instruction which interrupts the reading of the micro instruction until the start of the next frame. EXIT is a micro instruction which ends the reading of the micro instruction to set the end detection flag 23. SET 5, ADD is a micro instruction for setting the processing circuit 5 at an addition processing state; SET 5, INV is a micro instruction to set the processing circuit 5 in a luminance inverting state; and SET 6, DISPLAY is a micro instruction for setting the image output circuit 6 at an image display state.

The processing is started with the host CPU loading the said microprogram to the microprogram memory 20 in the control circuit 2. The microprogram may be set in advance. Thereafter, the host CPU 1 applies an address counter clear request to the control circuit 2. In the control circuit 2, the address counter clear request is decoded by the host CPU command decoder 24, with the decode signal H4 applied to the address counter 21, thereby clearing the address counter 21. Then, the host CPU 1 applies a microprogram read start request to the control circuit 2. In the control circuit 2, the read start request is decoded by the host CPU command decoder 24. As a result, the decode signal H2 becomes active and informs the address count permitting signal generating circuit 26 of the generation of the read start request of the microprogram. The address count permitting signal generating circuit 26 enters the address counting state in accordance with the start command (decode signal H2), the start of the next new frame is detected by the rise of the timing signal T1, and the address count permitting signal is rendered active. Consequently, the counting operation of the address counter 21 is permitted, whereby the counter 21 successively counts the address from the address 0 using the timing signal T2 as the count clock.

When the microprogram of the list(I) is read, the micro instructions are outputted on the control bus 8 starting from the address 0 in order, and prescribed set operations are carried out. When the address counter 21 reaches the address 6, there appears the EOFR instruction, whereby the micro instruction decoder 25 in the control circuit 2 generates a decode signal M4. Upon reception of the decode signal M4, the address count permitting signal generating circuit 26 renders the address count permitting signal inactive and interrupts the counting operation of the address counter 21 at the address 7 until it is informed of the start of the next frame by the timing signal T1. By the reading of the micro instructions heretofor, the circuit to be controlled is set at the state of FIG. 3(a), and this state is maintained for the 1 frame. Read addresses and write addresses are applied from a separately provided address counter to the image memories 4a, 4b and 4c, whereby the access to the whole area of the image memories 4a, 4b and 4c are completed in frame, effecting the desired processing.

When the timing signal T1 rises and the address counter 21 starts the address count again, the micro instruction from the address 7 is read and the reading is again interrupted by the EOFR instruction at the address 13. By the reading of the micro instructions heretofor, the circuit to be controlled is set at the state of FIG. 3(b) and this state is maintained for the 1 frame.

At the next rise of the timing signal T1, the micro instruction is read from the address 14. When the EXIT instruction is read at the address 18, the micro instruction decoder 25 generates a decode signal M5. Upon reception of the decode signal M5, the address count permitting signal generating circuit 26 renders inactive the address count permitting signal to stop the address counting and, at the same time, it exits the address counting state. Therefore, even when the timing signal T1 rises again in the next frame, it does not render the address count permitting signal active. By the reading of the micro instructions heretofor, the circuit to be controlled is set in the state of FIG. 3(c) and this state will be maintained thereafter.

In this manner, by separately providing a micro instruction (EOFR instruction) interrupting the reading of the micro instructions in a frame and a micro instruction (EXIT instruction) ending the reading of the micro instructions, processes over a plurality of frames can be described by one microprogram, whereby the extra time required for inter-frame control can be eliminated.

EXAMPLE 2

In the example shown in FIG. 3 and in the list(I), the reading of the microprogram is interrupted. However, there is neither a branch nor a loop. In the following, an example including a loop in accordance with a conditional jump instruction and a loop exit command controlled by the host CPU 1 will be described with reference to FIG. 4 and a list (II).

FIG. 4 shows the relation of connection between each of the circuits when executing an arithmetic processing, in accordance with the order of the process. FIG. 4(a) shows a state in which the image data provided from the outside of the apparatus are successively inputted to the processing circuit 5 by the image input circuit 3 to be processed, the results are written in the image memory 4 and simultaneously, the results are inputted to the image output circuit 6 to be displayed. In this example, the state of FIG. 4(a) is continuously repeated until the flag register 28 is set by the host CPU 1. When the flag register 28 is set, the flow proceeds to the state of FIG. 4(b) in which the image data fixed in the image memory 4 are displayed. The list (II) is a microprogram for executing the process shown in FIG. 4.

| ADDRESS | LIST (II) | |
|---|---|---|
| | MICRO INSTRUCTION | |
| 0 | OUT | 3 → 9a |
| 1 | INP | 9a → 5 |
| 2 | OUT | 5 → 9b |
| 3 | SET | 5. GAM, |
| 4 | INP | 9b → 4 |
| 5 | INP | 9b → 6 |
| 6 | SET | 6, DISPLAY |
| 7 | EOFR | |
| 8 | JPC | FLG, 10 |
| 9 | JMP | 7 |
| 10 | IMRC | |
| 11 | RST | FLG |
| 12 | OUT | 4 → 9a |
| 13 | INP | 9a → 6 |
| 14 | SET | 6, DISPLAY |
| 15 | EXIT | |

In the above program, JPC FLG, 10 of the address 8 is a conditional jump instruction with the state of the flag register 28 being the jump condition. If the flag register 28 is set, the flow jumps to the address 10 and if the flag register 28 is not set, it proceeds to the next address 9. JMP at the address 9 is a non-conditional jump instruction. When this instruction is executed, the address jumps to 7. When these jump instructions are executed, more specifically, when the non-conditional jump instruction is executed, the address portion A of the microinstruction is decoded by the microinstruction decoder 25, and when the conditional jump instruction is executed, the address portion A of the microinstruction is decoded together with the jump conditions such as J1 and J2, whereby the decode signal M6 is generated. Consequently, the address counter 21 is set at the initial value set state, and the data portion D of the microinstruction indicating the jump address is applied to the initial value input of the address counter 21. As a result, the output of the address counter 21 is replaced by the address of the destination of jumping. RST FLG at the address 11 is a reset instruction of the flag register 28. By this instruction, the decode output M3 of the microinstruction decoder 25 is generated to reset the flag register 28. SET 5, GAM at the address 3 is a microinstruction for setting the processing circuit 5 at a non-linear gradation correcting process state.

When the microprogram of the list (II) is read starting from the address 0 in accordance with the command of the host CPU 1, the flow is set in the state of the FIG. 4(a) by the microinstructions to the address 7, and thereafter, it enters the loop from the address 7 to 9 in the succeeding frames. The operator monitors the processed image, which is continuously changed in accordance with the input image, through the output of the image output circuit 6. When the operator determines to finish the process, he may set the flag register 28 through the host CPU 1. Consequently, the microprogram in the loop jumps to the address 10 to exit the loop, since the jump condition is satisfied at the address 8. When the instruction is read from the address following the address 10, the program proceeds to the state shown in FIG. 4(b) and the reading of the microprogram is finished at the address 15.

As described above, by providing a conditional jump instruction (JPC FLG) with the state of the flag register 28 which can be set from the host CPU being the condition, the exit command from an endless loop processing can be made possible by the control of the host CPU 1.

EXAMPLE 3

Finally, an example is shown in which a frame counter 29 is utilized for controlling the reading of the microprogram. FIG. 5 shows the relation of connection between each of the circuits in this case. FIG. 5(a) shows a state in which the reading of image data from the image input circuit 3 to the image memory 4, the reading of the image data existed in the image memory 4 before writing and the image display through the image output circuit 6 are simultaneously carried out. FIG. 5(b) shows a state in which the image data written in the state of FIG. 5(a) are outputted from the image memory 4 and displayed through the image output circuit 6.

| LIST (III) | |
|---|---|
| ADDRESS | MICRO INSTRUCTION |
| 0 | LD  FC, 29 |
| 1 | OUT  3 → 9a |
| 2 | INP  9a → 4 |
| 3 | OUT  4 → 9b |
| 4 | INP  9b → 6 |
| 5 | SET  6, DISPLAY |
| 6 | EOFR |

-continued

| LIST (III) | |
|---|---|
| ADDRESS | MICRO INSTRUCTION |
| 7 | IMRC |
| 8 | OUT  4 → 9a |
| 9 | INP  9a → 6 |
| 10 | SET  6, DISPLAY |
| 11 | JPC  FC, 0 |
| 12 | DOWN. FC |
| 13 | EOFR |
| 14 | JMP  11 |

In the microprogram shown in the list (III), the state of FIG. 5(a) is executed for 1 frame, and the state of FIG. 5(b) is executed for 29 frames, and thereafter the states of FIGS. 5(a) and (b) are automatically repeated. Namely, the new image input is carried out in the 30 frame period, and the same image data is continuously displayed from the image input to the next image input. When 1 frame comprises 1/30sec as in a general case, an intermittent display can be realized by this processing in which the images to be displayed vary every second. In the program, LD FC, 29 at the address 0 is a microinstruction setting an initial value 29 in the frame counter 29; DOWN.FC at the address 12 is a microinstruction counting down the frame counter 29 by 1; and JPC FC, 0 at the address 11 is a conditional jump instruction in which the count value of the frame counter 29 being 0 is a jump condition.

When the microprogram of the list(III) is read starting from the address 0 in accordance with the command from the host CPU 1, it is set in the state of FIG. 5(a) until the address 6, and it is set in the state of FIG. 5(b) in the next frame in accordance with the microinstructions from the address 7 to the address 13. It should be noted that the value of the frame counter 29 is counted down by one to be 28. In the succeeding frame, it enters the loop from the address 11 to the address 14 in accordance with the jump instruction at the address 14. The frame counter 29 is continuously counted down at every frame in the loop also. When the value of the frame counter 29 becomes 0, the jump condition of the conditional jump instruction at the address 11 is satisfied, and the flow jumps to the address 0 to return to the state of FIG. 5(a). The state of FIG. 5(b) is continued for 29 frames. Since the initial value 29 is again set in the frame counter 29 at the address 0, the above described operation is endlessly repeated. The escape from the endless loop can only be realized by the end command from the host CPU 1. When the end command is applied to the host CPU command decoder 24, the decode signal H3 is generated to force the address count permitting signal generating circuit 26 in address count state to exit the address count state, whereby the address counter 21 stops and the transmission of the microinstructions is stopped.

In this example, the processing circuit 5 is not utilized in order to simplify the description of the operation of the frame counter 29. By using the frame counter 29 together with the processing circuit 5, the interval between processes and the time of processes of the processing circuit 5 can be controlled by the microprogram. As described above, by providing a frame counter 29 which can carry out the counting operation and which can be initialized in accordance with the microinstruction, and by providing the conditional jump instruction (JPC FC) with the count value of the frame counter 29 being the condition, the software processing of the host CPU 1 can be eliminated even in the loop processing in which the numbers are designated.

The control method by the control circuit 2 of FIG. 2 has been described with three examples. It is shown that the control operation in synchronization with the operation timing of the hardware can be carried out even in a process over a plurality of frames, that the escape from the loop can be done by the control from the host CPU 1, and that the escape from the loop can be carried out utilizing an internal frame counter 29.

By providing various microinstructions for reading microprogram, the software processing by the host CPU can be suppressed as small as possible. When the circuits to be controlled by the microinstructions operate passively, the above described control method is satisfactory. However, if the flow of reading the microprogram should be changed using the numerals and states resulting from the operation of the circuits to be controlled, the host CPU must check the result of operation and starts a new must check the result of operation and starts a new different microprogram. Namely, in the prior art, the state obtained from the circuit which is controlled in 1 microprogram can not be utilized as the jump condition for the conditional jump instruction.

For example, let us consider a case in which an input image is compared with a reference image in the image memory 4, a portion of the image which is largely different from the reference image is regarded as a defective portion, and the area of the defective portion is evaluated to change the flow of processing. In the prior art, even if the area of the defective portion can be calculated in the processing circuit 5, the area value can not be evaluated in the control circuit 2. In addition, the reading of the microprogram can not be controlled in accordance with the result of the evaluation. Therefore, when the area of the defective portion is calculated by the processing circuit 5, the control is temporality referred to the host CPU 1, the host CPU 1 evaluates the area value, and whether the same microprogram should be executed or another microprogram should be carried out is determined according to the result of evaluation. This operation comprises two disadvantages, namely, the real time processing on successively inputted image data is not possible; and the control by the host CPU and the control by the microprogram are mixed in a series of control operation, making troublesome the control flow. The former disadvantage is fatal in some cases.

Let us consider a case in which an image to be processed is processed repeatedly, the image changes as the process proceeds, and the change is stopped when the process is completed. In such processing, the host CPU 1 must determine the completed state in some way to stop the reading of the microprogram in order to finish the process. On this occasion, the end determining operation of the host CPU 1 and the read stop request of the microprogram are not in synchronization with the operation timing of the hardware. Therefore, there is always a delay between the actual end and the stop of reading of the microprogram. When a real time processing is required, this delay becomes a problem. When the process should be stopped at a state during the change of the image and not at the end of the process with the change of the image stopped, the delay caused by the existence of the software processing by the host CPU 1 generates a necessary change on the image to be processed.

SUMMARY OF THE INVENTION

The present invention was made to solve the above described problems and its object is to provide a digital image processing apparatus in which the flow of reading microprogram can be changed with the information resulting from the process being the condition.

Briefly stated, the present invention is an image processing apparatus comprising at least a hardware portion carrying out input/output, storing and arithmetically processing images, and a control portion controlling the hardware portion. The said control portion comprises a microprogram memory storing a microprogram constituted by microinstructions of a plurality of steps; an address counter applying a read address to the microprogram memory; a host CPU setting the microprogram, setting initial value of the address counter, and requesting count start; a microinstruction decoder for decoding microinstructions read from the microprogram memory; and a flag register which is set dependent on the change of states generated from the arithmetic processing in the hardware portion. The microinstruction comprises at least an instruction for controlling the hardware portion and an instruction for setting the initial value of the address counter. The initial value setting instruction comprises an instruction for setting the initial value of the address counter with the state of the flag register being the condition thereof.

The function of the present invention will be described in detail with reference to FIG. 1. A microprogram constituted by microinstructions of a plurality of steps is stored in the microprogram memory 20. The microprogram is set by the host CPU 1 in the microprogram memory 20. The host CPU 1 sets the initial value in the address counter 21 and requests count start of the address counter 21. When the address counter 21 is incremented from the initial value, the microprogram stored in the microprogram memory is successively read starting from the address of the initial value. Respective microinstructions constituting the read microprogram are decoded in the microinstruction decoder 25. The microinstruction comprises instructions for controlling the hardware portion for effecting input/output, storing and arithmetically processing the images, and the instructions for controlling are applied to the hardware portion to set or update the operating state. The microinstruction comprises an initial value setting instruction of the address counter 21. When this instruction is read, the address counter 21 is successively incremented from the newly set initial value, and the microprogram stored in the microprogram memory 20 is successively read starting from the new address. The initial value setting instruction comprises an initial value setting instruction with the state of the flag register 28a being the condition, wherein the state of the flag register 28a is set dependent on the change of the state generated by the arithmetic processing in the hardware portion. When this instruction is read, a new initial value is set in the address counter 21 when the flag register 28a is in a prescribed state. Otherwise, the address counter 21 is incremented directly. Therefore, the flow of reading the microprogram from the microprogram memory 20 can be changed dependent on the change of the state generated by the arithmetical processing in the hardware portion.

Since the present invention functions as described above, the processing can be stopped without delay automatically when the end condition is satisfied, so that there is no need of the host CPU monitoring the hardware portion when a repeating operation is required, for example. In addition, the automatically switching operation of the processes having different parameters dependent on the result of processing can be effected without using the host CPU, whereby the flow of control can be made simple and the possibility of real time processing for the successively inputted image data can be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 5 show variations of processes carried out by the digital image processing apparatus shown in FIG. 1;

FIG. 6 is a block diagram showing an example of the structure of the control circuit employed in the digital image processing apparatus in accordance with the present invention;

FIG. 7 shows the structure of an area counter employed in one example of the present invention;

DESCRIPTION OF THE PREFERRED EMBODIMENTS

Figure 1:
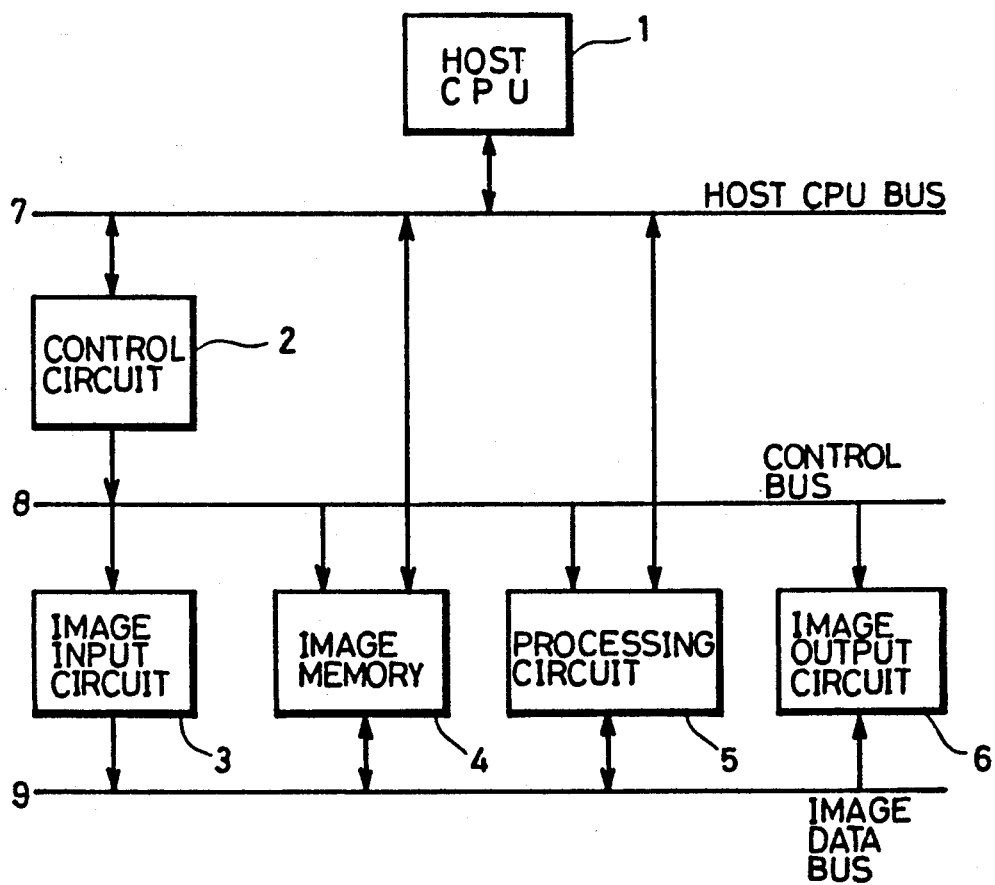
FIG. 1 is a block diagram showing a whole structure of a previously proposed digital image processing apparatus.
Figure 2:
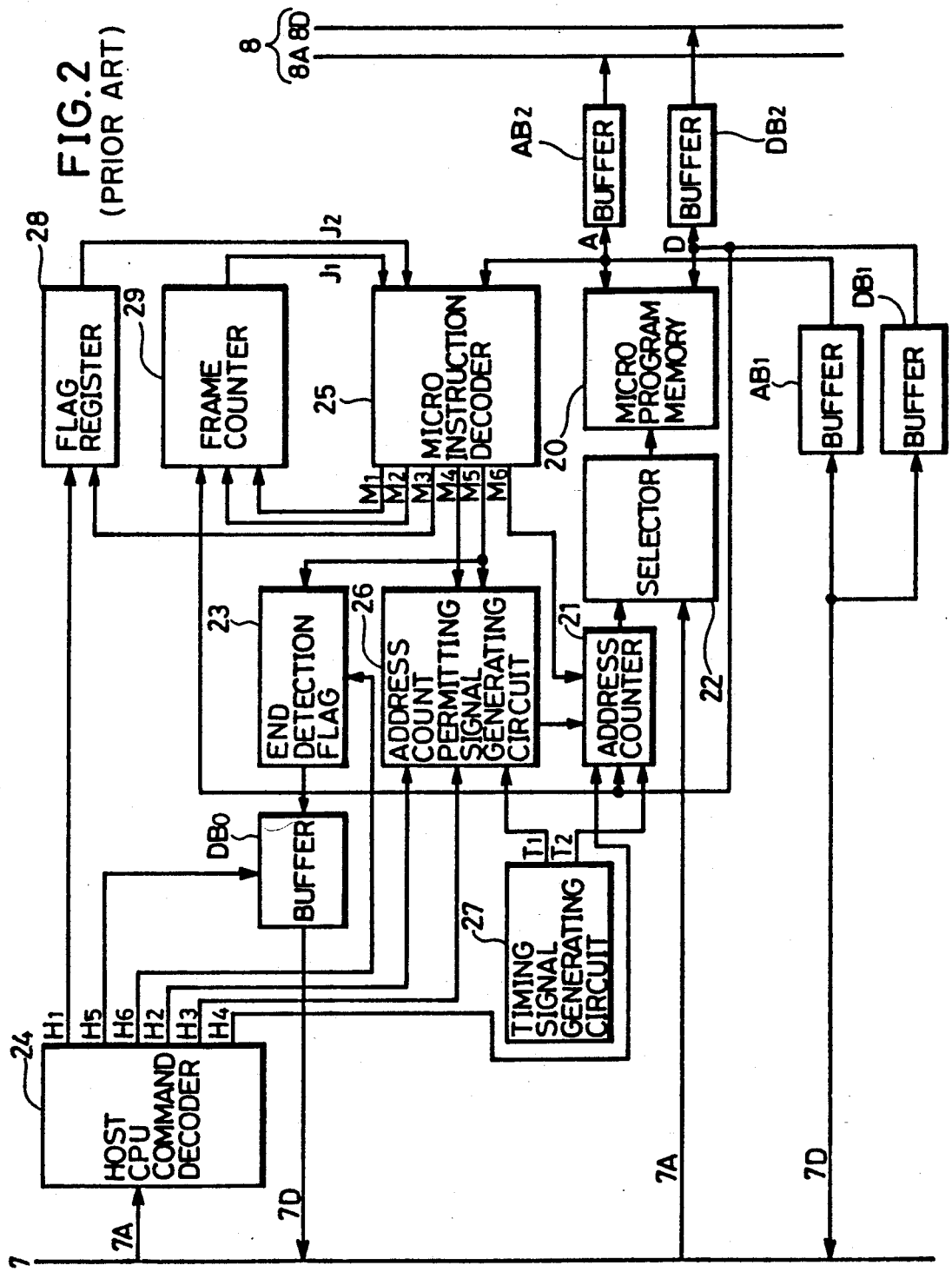
FIG. 2 is a block diagram showing a structure of a control circuit employed in the digital image processing apparatus of FIG. 1.
Figure 4A:
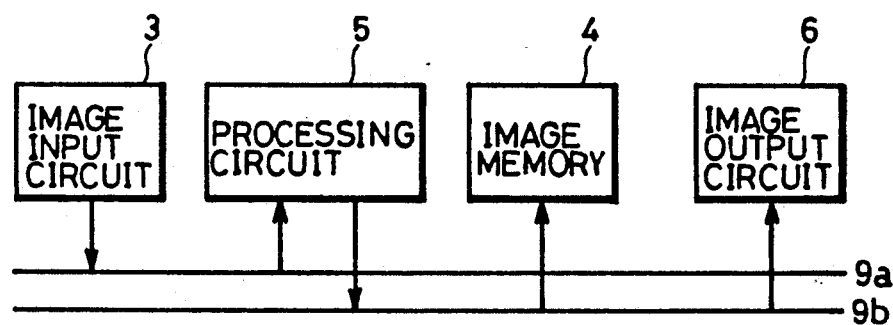
Figure 4B:
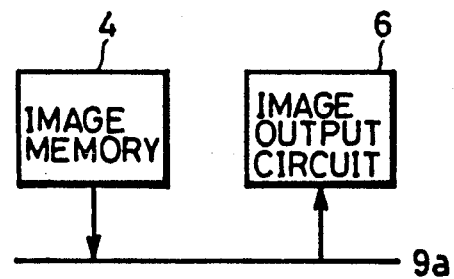
Figure 5A:
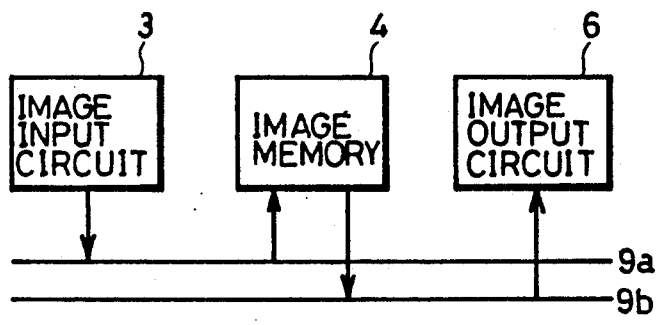
Figure 5B:
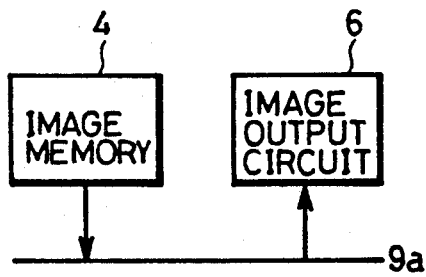

The embodiments of the present invention will be described in the following. The schematic structure of the digital image processing apparatus of the present invention comprises, as in the apparatus of FIG. 1, a host CPU 1, a control circuit 2 and various hardware circuits (image input circuit 3, image memory 4, processing circuit 5, image output circuit 6, and so on). The control circuit is connected to the host CPU 1 through the host CPU bus 7 as well as to respective hardware circuits 3~6 through the control bus 8. Data can be transmitted between each of the hardware circuits 3~6 through the image data bus 9. FIG. 6 shows an example of the structure of a control circuit employed in the digital image processing apparatus of the present invention. It is different from the control circuit 2 shown in FIG. 2 in the following points. Namely, a flag register 28a is arranged which is set by a pulse generated on a signal line 8F which is newly provided to the control bus 8, and the state of the new flag register 28a becomes available as a new jump condition J3 of the microinstruction decoder 250. Accordingly, the microinstruction decoder 250 can decode a newly defined conditional jump instruction employing the jump condition J3 and a microinstruction for resetting the new flag register 28a. In the figure, the output M7 of the microinstruction decoder 250 is a reset instruction decode signal of the new flag register 28a. Except for the above described difference, the control circuit 200 of FIG. 6 includes all the functions of the control circuit 2 shown in FIG. 2, so that it can carry out all of the above described control operations. Therefore, portions corresponding to the control circuit 2 of FIG. 2 are denoted by the same reference numerals, with the description thereof omitted.

Prior to the description of the control operation of the present embodiment, an example of a circuit structure capable of outputting determination of a result of arithmetic operation to a signal line 8F will be described.

FIG. 7 shows a circuit which counts the number of pixels of "0" level or "1" level of a binary image and outputs pulse on the signal line 8F when the counted number exceeds a certain set value. In the figure, the counter 10 is structured such that the count value CT is incremented by a count clock CK when a count permitting signal CE is active. A microinstruction decoder 11 decodes address portions 8A of microinstruction for the circuit. The data portions 8D of the microinstructions are latched in a condition register 12 in accordance with the decode signal d1, the data portion 8D of the microinstruction is loaded in the counter 10 as the initial value of the count in accordance with the decode signal d2, and the count value of the counter 10 is cleared to be 0 in accordance with the decode signal d3. A buffer 13 is a tri-state buffer which outputs a carry output CR, which is generated when the count value of the counter 10 reaches the maximum value, to the signal line 8F. The buffer 13 can transmit the carry output CR to the signal line 8F when a signal l1 outputted from the condition register 12 is active. A count permitting signal generating circuit 14 applies a binary data BD obtained from an image data bus C19 to the counter 10 as the count permitting signal CE when the signal l2 outputted from the condition register 12 is active, with the logic of the output signal inverted dependent on the state of the signal l3. An externally applied image data valid area signal VD prevents the count permitting signal CE from being rendered active out of the image area. A buffer 15 is a data buffer by means of which the host CPU1 reads the count value CT of the counter 10 through the host CPU bus 7. The data buffer 15 becomes an output enabled state by an output permitting signal EN generated when the address decoder 16 decodes an address corresponding to the buffer 15.

In the following, an example of processing employing the control circuit 200 of FIG. 6 as well as the effectiveness of the newly provided signal line 8F will be described.

EXAMPLE 4

Figure 8:
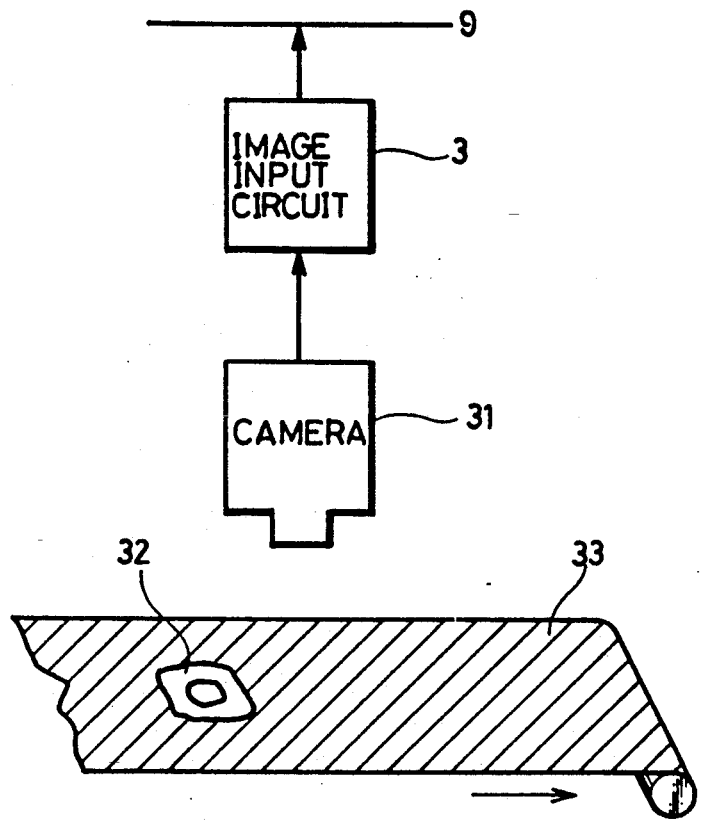
FIG. 8 illustrates the state in which the image to be processed is inputted to the digital image processing apparatus in accordance with one embodiment of the present invention.

FIG. 8 illustrates the inputting state of an image to be processed. Referring to the figure, an object 32 is on a conveyer 33 to be transferred to the direction of the arrow with a TV camera 31 picking the object 32 up. On the side of the image processing apparatus, the image signals obtained from the TV camera 31 are converted into image data of an appropriate type through the image input circuit 3 to be outputted on the image data bus 9. The image data obtained is as shown in FIG. 9, and the object 32 on the screen moves from left to right of the screen as the time passes.

Figure 9:
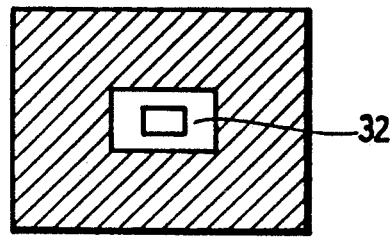
FIG. 9 shows one example of an input image obtained from the structure of FIG. 8.

Now, let us consider a case in which the shape of the object 32 included in the image data of FIG. 9 is analyzed to obtain some pieces of information, as an example of a definite processing on the image data obtained in the above described manner. Generally, the analyzing process requires long period of time, so that the processing must be carried out with the moving object 32 being always fixed at a prescribed position of the screen. What is troublesome in the procedure is the determination of timing of sampling the input image data into the image memory 4 as a static image. More specifically, since the object 32 is moving, a portion of the object 32 of interest or the object 32 itself may possibly be out of the screen when the sampling is carried out at random timing.

Figure 10:
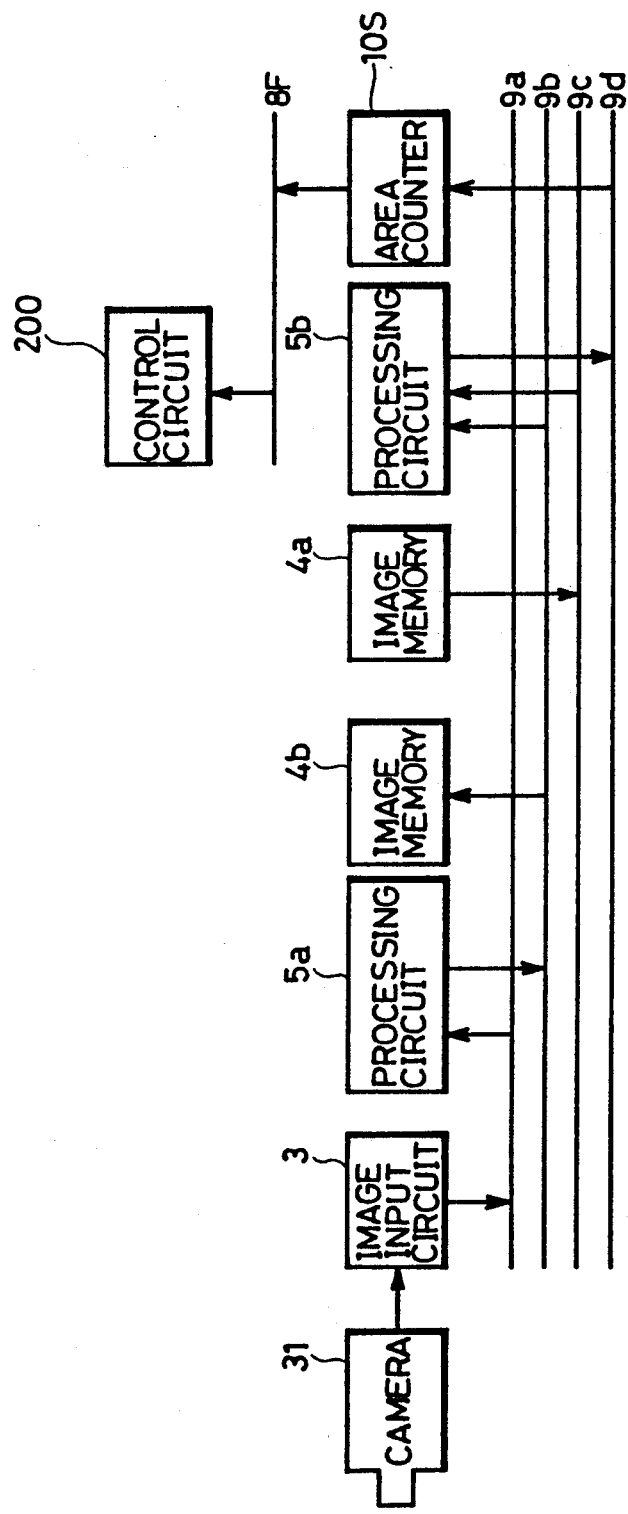
FIG. 10 is a block diagram illustrating the image data processing by the digital image processing apparatus in accordance with one embodiment of the present invention.
Figure 11:
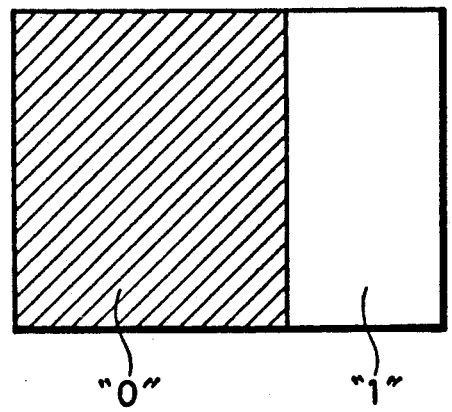
FIG. 11 shows a mask image employed for the image data processing in the embodiment shown in FIG. 10.

An example of a structure of an image processing apparatus for solving the above described problem is shown in FIG. 10. In this example, the image input data is at first outputted on the image data bus 9a as multiple-value image data through the image input circuit 3. The image data on the image data bus 9a is turned into binary image data by a processing circuit 5a which carries out the binary converting process to be outputted on the image data bus 9b. The binary image data on the image data bus 9b is an image in which the object 32 on the screen moves from the left to the right of the screen as time passes. What should be done in this procedure is to write a static image in which the object 32 is fixed at an appropriate position to the image memory 4b in preparation for the succeeding processes. For this purpose, an image memory 4a is prepared, in which a mask image such as shown in FIG. 11 is stored. This mask image is outputted to the image data bus 9c, and an AND operation between the binary image and the mask image for the input image is carried out in the processing circuit 5b. The output of the result of the operation is inputted to an area counter 10S through the image data bus 9d to count the area value.

In the area counter 10S (see FIG. 7), a certain finite negative value is set in the counter 10 as an initial value. Since the signal 12 is set active, the count permitting signal CE becomes active every time a pixel of the logic "1" is inputted, whereby the counter 10 is incremented with the count value exceeds 0 to a positive value. When the count value changes from minus 1 to 0, a carry output CR is generated from the counter 10. Since the signal 11 is set active, a pulse is outputted through the tri-state buffer 13 to the signal line 8F.

The mask image stored in the image memory 4a is a binary image in which the logic "1" is set only in the region on the right side of the screen as shown in FIG. 11. Therefore, the pixel of the logic "1" is not included in the output data from the processing circuit 5b until the object in the input image reaches the right side of the screen. More specifically, whether the object 32 reached the prescribed position or not can be detected by counting the output data from the processing circuit 5b to determine that the counted value is positive, whereby, the timing of writing into the image memory 4b can be determined. On this occasion, the setting of the operation state must be changed from the object position detecting state to the writing state into the image memory 4b. The following list (IV) shows a microprogram for automatically changing the operation state.

| ADDRESS | LIST (IV) MICRO INSTRUCTION | |
|---|---|---|
| 0 | OUT | 3 → 9a |
| 1 | INP | 9a → 5a |
| 2 | SET | 5a, BINARY CONVERSION |
| 3 | OUT | 5a → 9b |
| 4 | OUT | 4a → 9c |
| 5 | INP | 9b, 9c → 5b |
| 6 | SET | 5b, AND |
| 7 | OUT | 5b → 9d |
| 8 | INP | 9d → 10S |
| 9 | LD | 10S, −1 |
| 10 | EOFR | |
| 11 | JPC | 8F, 13 |
| 12 | JMP | 9 |
| 13 | OUT | 5a → 9b |
| 14 | INP | 9b → 4b |
| 15 | EOFR | |
| 16 | IMRC | |
| 17 | EXIT | |

The microinstructions in the list IV are the same as those employed in the lists I~III. The instruction at the address 2 sets the processing circuit 5a at a binary processing state, and the instruction at the address 6 sets the processing circuit 5b at an AND operation state. The instruction at the address 9 sets an initial value −1 at the area counter 10S. Namely, when there is at least 1 pixel of the logic "1", a pulse is outputted to the signal line 8F. The instruction at the address 11 is a conditional jump instruction with the generation of pulse on the signal line 8F in the proceeding frame being the condition.

When the microprogram of the list IV is read starting from the address 0 onto the control bus 8 in accordance with a command from the host CPU 1, at first the instructions at the addresses 0 to 10 are read in the first frame to bring the state of detecting the position of the object 32. If the object 32 has already been in the right side of the screen in the first frame, the area counter 10S generates a pulse on the signal line 8F. In the second frame, the micro instructions are read starting from the address 11 and, at first, whether the pulse is generated or not on the signal line 8F in the last frame is checked. If there was no pulse generated, the flow returns to the address 9 to continue the position detecting state for 1 frame. There will be no pulse until the object 32 reaches the right side of the screen, and therefore a loop is formed from the address 9 to the address 12. If there was a pulse generated, the flow jumps from the address 11 to the address 13 to escape from the loop, and the binary converted input image data obtained from the processing circuit 5a are written in the image memory 4b through the image data bus 9b. In the succeeding frame, the microinstruction is read from the address 16, the input/output to and from the image memory 4b is prohibited by the IMRC instruction, and therefore image data written in the last frame is fixed. The reading of the microprogram is terminated by the final EXIT instruction.

If the counted value of the area counter 10S is read by the host CPU 1 and different microprograms are executed in accordance with the value in order to realize the processing of the present example, there will be a time lag generated in changing the setting from the position detecting state to the image writing state, and therefore, the input image can not be correctly sampled. However, in this embodiment, since the signal line 8F is provided, the conditional jump instruction with the constantly changing area value being the condition can be inserted into the micro instructions. Therefore, the setting can be changed corresponding to the change of the input image on real time.

EXAMPLE 5

In the following, an example of another use of the control circuit 200 shown in FIG. 6 will be described. In the above example, the change of the area value from 0 to a certain positive value was the condition for switching the operation state. In this example, the change of the area value from a positive value to 0 is a condition for terminating the process, and a certain repeating process is automatically terminated.

In the processes of pattern recognition or character recognition, the images to be processed are often converted into line images in advance. The line image means an image constituted by segments having the line width of 1 pixel. The process to convert the input image to the line image is called a line image conversion. In the line image conversion, in the inputted binary image data, pixels which are apparently not the elements of the line image are successively erased from the outer side of the object and this process will be repeated. The necessary number of repetition is changed in correspondence with the size and width of the object to be converted into a line image. In a conventional image processing apparatus, the number of repetition is set previously, and the conversion into line image is carried out for the set number of times. When the set number is small, some portions are left no perfectly converted into line images. Therefore, a relatively large number is set. Consequently, the conventional manner has two problems. Namely, a long period of time is required for processing, since extra repetition is required, and whether the conversion into line image is perfectly done or not can not be determined.

Figure 12:
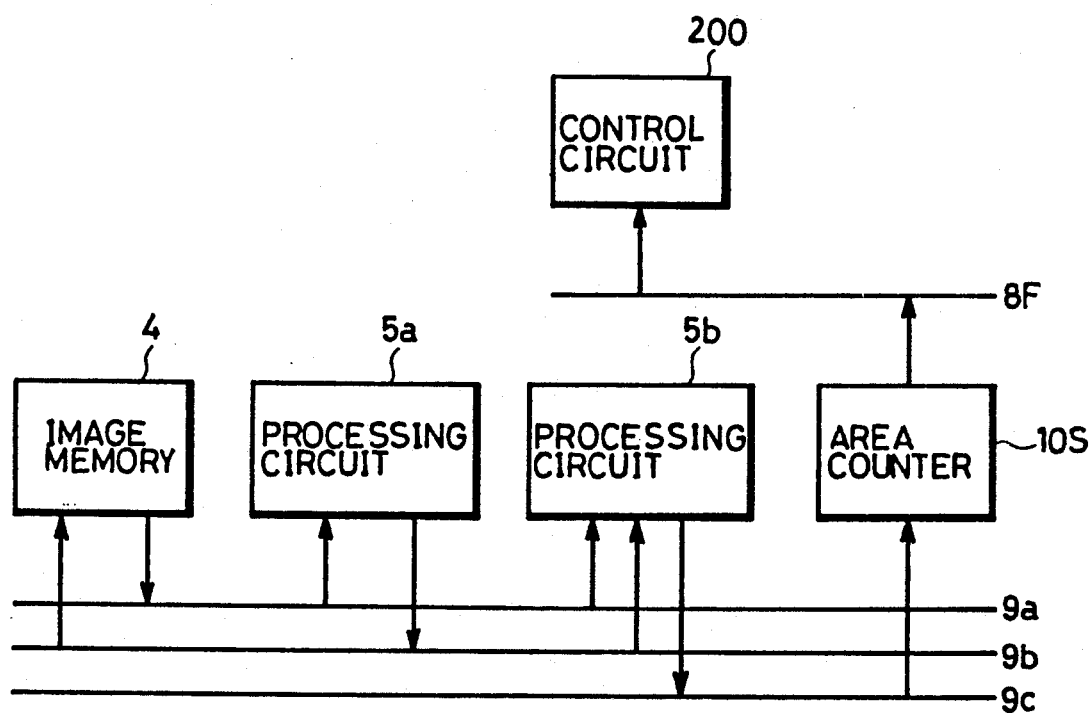
FIG. 12 is a block diagram illustrating the image data processing by the digital image processing apparatus in accordance with another embodiment of the present invention.

FIG. 12 shows a structure of an image processing apparatus in which the conversion int line image can be stopped automatically by determining the end of the process without requiring setting of the number of repetition. Referring to the figure, images to e processed which are converted into line images are stored in the image memory 4 at the start. As the process proceeds, the developments during the conversion into line image are successively stored therein. The processing circuit 5a carries out the line image conversion on the data read from the image memory 4 and outputted onto the image data bus 9a, with the result of conversion outputted to the image data bus 9b. The data are read from the image memory 4 to the image data bus 9a and the line image converted output on the image data bus 9b are written in the memory 4 simultaneously. More specifically, the data read from the image memory 4 are the result of conversion into the line image of the last frame, and the process proceeds frame by frame in this manner. The processing circuit 5b carries out the exclusive OR operation between the data resulting from the conversion of the last frame on the image data bus 9a and the data resulting from the conversion of the present frame on the image data bus 9b, the result of the operation is outputted to the image data bus 9c to be inputted to the area counter 10S, where the number of pixels of portions having different logics between two images is counted. During the process of conversion into line image, the results of the process of two frames are different from each other, and therefore the counted value will be a finite positive value. If an initial value $-1$ is set in the area counter 10S, a pulse is surely generated to the signal line 8F when 1 or more pixel is counted. When the line image conversion is completed, there will be no charge in the results of the process of successive 2 frames, and the count value of the area counter 10S remains at the initial setting, so that there is no pulse outputted on the signal line 8F. In other words, 1 pulse is outputted per 1 frame on the signal line 8F during the process, and no pulse is outputted after the completion of the process. Determination of the end of the process can be detected in this manner. The microprogram for realizing this process is shown in the list V.

| ADDRESS | LIST (V) MICRO INSTRUCTION | |
|---|---|---|
| 0 | JPC | 8F, 2 |
| 1 | JMP | 14 |
| 2 | OUT | 4 → 9a |
| 3 | INP | 9a → 5a |
| 4 | SET | 5a, LINE IMAGE CONVERSION |
| 5 | OUT | 5a → 9b |
| 6 | INP | 9b → 4 |
| 7 | INP | 9a, 9b → 5b |
| 8 | SET | 5b, EXOR |
| 9 | OUT | 5b → 9c |
| 10 | INP | 9c → 10S |
| 11 | LD | 10S, −1 |
| 12 | EOFR | |
| 13 | JMP | 0 |
| 14 | IMRC | |
| 15 | EXIT | |

In the above program, the instruction at the address 4 is a microinstruction setting the process circuit 5a at the line image converting state, and the instruction at the address 8 is a microinstruction setting the processing circuit 5b at the exclusive OR state. During the process, a loop from the address 0 to the address 13 is formed, and the loop is repeated until the process is terminated. Whether the flow exits the loop or not is determined every frame at the address 0. When the line image conversion is terminated in the second last frame, the result of the process of the second last frame and that of the last frame will be the same. In that case, the output from the processing circuit 5b which is the input data to the area counter 10S is fixed at the logic "0", no pulse is generated on the signal line 8F and the jump condition at the address 0 is not satisfied. Therefore, the microinstruction of the address 1 is executed to jump to the address 14 to exit the loop. At the address 14, the IMRC instruction is read, the input/output to and from the image memory 4 is prohibited, and the final result of the line image conversion is fixed in the image memory 4. The reading of the microinstructions is terminated by the EXIT instruction at the next address 15.

As described above, according to this example, there is no possibility of imperfect conversion into line images. In addition, the process can be automatically terminated and line image conversion requiring no extra time period can be provided.

Although various examples of use of the present invention have been described with definite examples, the circuit outputting the pulse on the signal line 8F is not limited to the circuit counting the area, and other circuits may be employed for this purpose. Two or more circuits may be provided. In that case, however, the circuits should be adapted not to generate pulses at the same time. The signal line 8F is not limited to one and two or more lines may be provided. In that case, flag registers should be added in the control circuit, and the number of jump condition input terminals in the microinstruction decoder should be increased. By doing so, more complicated condition determination can be carried out on real time on the microprogram level.

The end of reading of the microprogram is determined by the host CPU 1 checking the end detection flag 23 which is set by the EXIT instruction. However, the end of reading may be positively informed by interrupting the host CPU 1 at the set of the end detecting flag 23. When the host CPU 1 is interrupted, it checks the end detecting flag 23 of the control circuit 2 to determine whether the interruption is generated from the control circuit 200 or not. If it is determined that the interruption is generated from the control circuit 200, it resets the end detecting flag 23.

As described above, in the present invention, the setting of initial values of the address counter for reading microprogram memory is effected by microinstructions in accordance with the result of arithmetic operation in the hardware portion in an image processing apparatus in which the control of the hardware portion is effected in accordance with the microprogram. Therefore, the flow of the microprogram reading can be changed directly in correspondence with the change of the state generated in the hardware portion and not through the host CPU. Consequently, the flow of control can be simplified and the possibility of real time processing can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An digital image processing apparatus comprising a hardware portion means for operating at a first cycle and inputting/outputting, storing and processing images, and a control portion controlling said hardware portion means, wherein said control portion comprises:
   a host CPU operating at a second cycle different from the first cycle of the hardware portion means and having a first bus; and
   a control circuit connected to the first bus, having a second bus connected to the hardware portion means, operating at the first cycle and including;
   a microprogram memory for storing a microprogram constituting a plurality of steps of microinstructions;
   an address counter for applying a read address to said microprogram memory;
   a microinstruction decoder for decoding a microinstruction read from said microprogram memory; and
   a flag register, connected to said hardware portion means through the second bus, which is set or reset depending on the result of an operation in said hardware portion means; and
   a counter circuit which is included in said hardware portion means and counts the number of pixels of logic "1" or "0" of binary image data outputted from said hardware portion means, an input of the flag register being connected to a carry output of said counter circuit, and said microprogram including a microinstruction for initially setting a negative value in said counter circuit; and
   wherein said host CPU loads the microprogram into said microprogram memory, sets a start address of the microprogram in said address counter and requests the start of said address counter, and said microprogram includes at least a microinstruction for controlling said hardware portion means and a microinstruction for checking a state of said flag register every one frame and setting a jump address of the microprogram in said address counter depending on the state of said flag register.

2. A digital image processing apparatus comprising:
   a host CPU operating in synchronization with a clock and having a first bus;
   an image processing circuit for processing image data in synchronization with a video rate different from the clock, said image processing circuit comprising,
   a hardware portion means for inputting/outputting, storing and processing the image data; and
   a control circuit, connected to the first bus of the host CPU and having a second bus connected to said hardware portion, for controlling said hardware portion means, said control circuit including,
   a microprogram memory for storing a microprogram constituting a plurality of steps of microinstructions,
   an address counter for applying a read address to said microprogram memory, and
   a microinstruction decoder for decoding a microinstruction read from said microprogram memory; and
   a counter circuit which is included in said hardware portion means and counts the number of pixels of logic "1" or "0" of binary image data outputted from said hardware portion means, an input of the control circuit being connected to a carry output of said counter circuit, and said microprogram including a microinstruction for initially setting a negative value in said counter circuit; and
   wherein said host CPU loads the microprogram into said microprogram memory and sets a start address of the microprogram in said address counter and requests the start of said address counter in synchronization with the clock, and said address counter is set to a jump address depending on a result of the image processing in said hardware portion means ever one frame.

* * * * *